US011838153B1

(12) United States Patent
Hossain et al.

(10) Patent No.: US 11,838,153 B1
(45) Date of Patent: Dec. 5, 2023

(54) DIGITAL SIGNAL PROCESSORS PROVIDING SCALABLE DECISION FEEDBACK EQUALIZATION (DFE) EMPLOYING SEQUENCE SELECTION AND RELATED METHODS

(71) Applicant: Microsoft Technology Licensing, LLC, Redmond, WA (US)

(72) Inventors: Md Masum Hossain, Edmonton (CA); Charles Boecker, Ames, IA (US); Michael Raymond Trombley, Cary, NC (US); Simon S. Li, Cupertino, CA (US); Shaishav A. Desai, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/853,198

(22) Filed: Jun. 29, 2022

(51) Int. Cl.
*H04L 25/03* (2006.01)

(52) U.S. Cl.
CPC .............. *H04L 25/03057* (2013.01)

(58) Field of Classification Search
CPC ............... H04B 1/0039; H04B 1/0042; H04L 25/03006; H04L 25/03019; H04L 25/03057; H04L 25/03076; H04L 25/03885
USPC ......... 375/229, 232, 233, 348–350; 708/322, 708/323
See application file for complete search history.

(56) References Cited

U.S. PATENT DOCUMENTS 11,133,963 B1* 9/2021 Zheng ................... H04B 1/123
2022/0311449 A1* 9/2022 Tachibana ............... H04L 7/00

FOREIGN PATENT DOCUMENTS

WO   WO-2022197460 A1 *  9/2022   ........... H03G 3/3042

OTHER PUBLICATIONS

Meyr, et al., "Digital Communication Receivers: Synchronization, Channel Estimation, and Signal Processing", In Publication of Wiley Online Library, vol. 444, Jan. 1, 1998, pp. 679-721.
"International Search Report and Written Opinion Issued in PCT Application No. PCT/US23/022626", dated Aug. 17, 2023, 12 Pages.

* cited by examiner

*Primary Examiner* — Young T. Tse
(74) *Attorney, Agent, or Firm* — Withrow & Terranova, PLLC

(57) ABSTRACT

A digital signal processor includes analog to digital converters to convert an analog voltage to digital voltage in unit intervals of an analog signal. A decision feedback equalizer (DFE) determines a first level of a digital sum of a digital voltage in a first UI and digital voltages of adjacent UIs (taps). The DFE identifies predetermined sequences of levels of consecutive UIs that include the first level and selects one of the predetermined sequences to decode digital data encoded in the analog signal in the UI. The DSP may be programmable to include taps from UIs that may affect the first UI. The predetermined sequences may include levels of the digital sums of consecutive UIs of the analog signal. The predetermined sequences may be identified in a look-up table based on the first level.

20 Claims, 10 Drawing Sheets

LOOK-UP TABLE (800)

604(Z)(1)

| L( ) | 1 | 2 | 3 | 4 | | N |
|------|---|---|---|---|---|---|
| Z | ✓ | | | | | |
| Y | ✓ | | | | | |
| X | ✓ | ✓ | | | | |
| W | ✓ | ✓ | | | | |
| V | ✓ | ✓ | ✓ | | | |
| U | ✓ | ✓ | ✓ | | | |
| T | ✓ | ✓ | ✓ | ✓ | | |
| S | ✓ | ✓ | ✓ | ✓ | | |
| R | ✓ | ✓ | ✓ | ✓ | | |
| Q | ✓ | ✓ | ✓ | ✓ | | |
| P | ✓ | ✓ | ✓ | ✓ | | |
| K | ✓ | ✓ | ✓ | ✓ | | |
| J | ✓ | ✓ | ✓ | ✓ | | |
| I | ✓ | ✓ | ✓ | ✓ | | |
| H | ✓ | ✓ | ✓ | ✓ | | |
| G | ✓ | ✓ | ✓ | ✓ | | |
| F | ✓ | ✓ | ✓ | | | |
| E | ✓ | ✓ | ✓ | | | |
| D | ✓ | ✓ | | | | |
| C | ✓ | ✓ | | | | |
| B | ✓ | | | | | |
| A | ✓ | | | | | |

DIGITAL SIGNAL PROCESSORS PROVIDING SCALABLE DECISION FEEDBACK EQUALIZATION (DFE) EMPLOYING SEQUENCE SELECTION AND RELATED METHODS

FIELD OF THE DISCLOSURE

The technology of the disclosure relates in general to medium-range device-to-device communication using pulse amplitude modulation (PAM) signaling.

BACKGROUND

Cloud-based computing may be performed in data centers with racks of processing devices that share processing tasks. Data is generated, processed, and stored in digital form in the respective processing devices but transferred from device to device in an analog signal. Transferring the data between devices at a high rate of data transmission and a low bit error rate (BER) reduces the amount of time a high-speed processing circuit waits for data, which affects performance and user experience of applications executed in the cloud. For transmission, digital data is converted to a symbol represented by a voltage of the analog signal during a unit interval (UI). With one symbol being transmitted in each UI, the rate of data transmission can be increased by reducing the period of each UI so that more symbols are transmitted in a period of time. However, the BER tends to increase as data transmission rate increases due to frequency-dependent channel attenuation, which can cause inter-symbol interference (ISI). An alternative method for increasing data transmission rates is to increase the amount (e.g., number of binary bits) of information in each symbol, which may also be referred to as the resolution or granularity of data. The number of bits of binary information in a symbol is increased by increasing the number of voltage thresholds that may be employed to represent data in the range of voltage of the analog signal. However, dividing the analog signal voltage into a greater number of thresholds reduces the separation between thresholds, increasing vulnerability to channel effects and the difficulty of distinguishing between adjacent thresholds. In receivers, analog-to-digital-converters (ADCs) are used to convert analog voltages of the analog signal to digital voltages, and digital signal processors (DSPs) operate on the digital voltages to compensate for the channel effects to accurately decode the symbols. However, the circuitry of conventional UIs can be more complex and power-hungry as more information is encoded into each symbol.

SUMMARY

Exemplary aspects disclosed herein include digital signal processors (DSPs) providing scalable decision feedback equalization employing sequence selection. Related methods of decoding digital data are also disclosed. A digital equalizer circuit employs an analog-to-digital-converter (ADC) to determine a digital voltage in each unit interval (UI) of an analog signal and employs a DSP to decode digital data encoded in each UI based on the digital voltage. The DSP includes a feed-forward equalizer (FEE) that generates a digital sum based on weighted digital voltages of a first UI and an adjacent UI. An exemplary DSP disclosed herein includes a decision feedback equalizer (DFE) circuit that determines a first level of the digital sum of the first UI, identifies at least one predetermined sequence of levels of consecutive UIs that include the first level, and selects one of the predetermined sequences to decode the digital data. In some examples, the first level of the digital sum is one of a discrete number of levels corresponding to possible values of the digital sum, and the at least one predetermined sequence comprises the levels of digital sums in known sequences of consecutive UIs. Based on the first level, the predetermined sequences may be identified in a look-up table. In some examples, the DSP is programmed to add weighted digital voltages of additional adjacent UIs to generate the digital sum of the first UI. The exemplary DFE avoids long critical paths caused by look-ahead subtraction circuits and high fan-in multiplexors used in conventional DSPs.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

Figure 4:
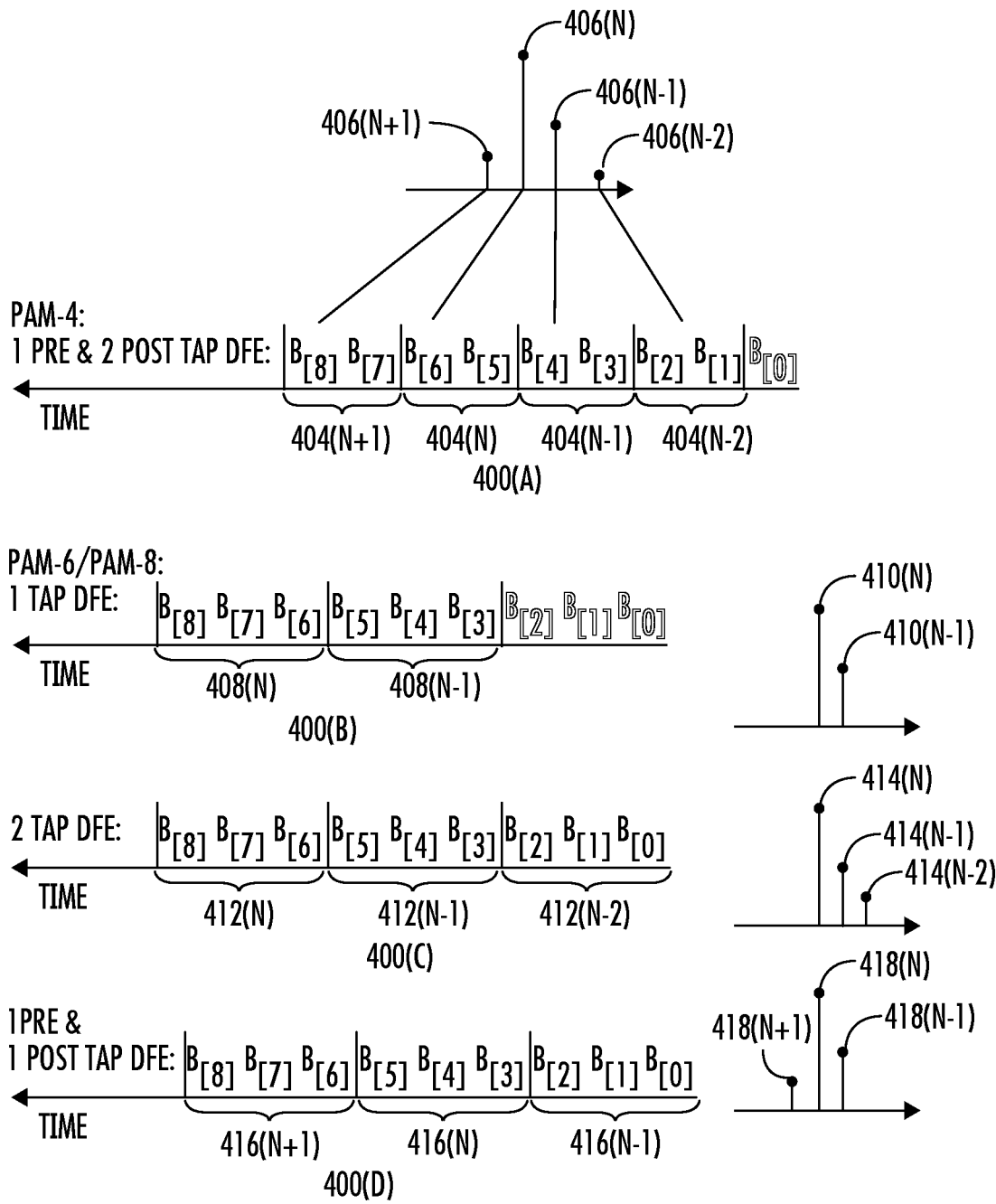
Figure 5:
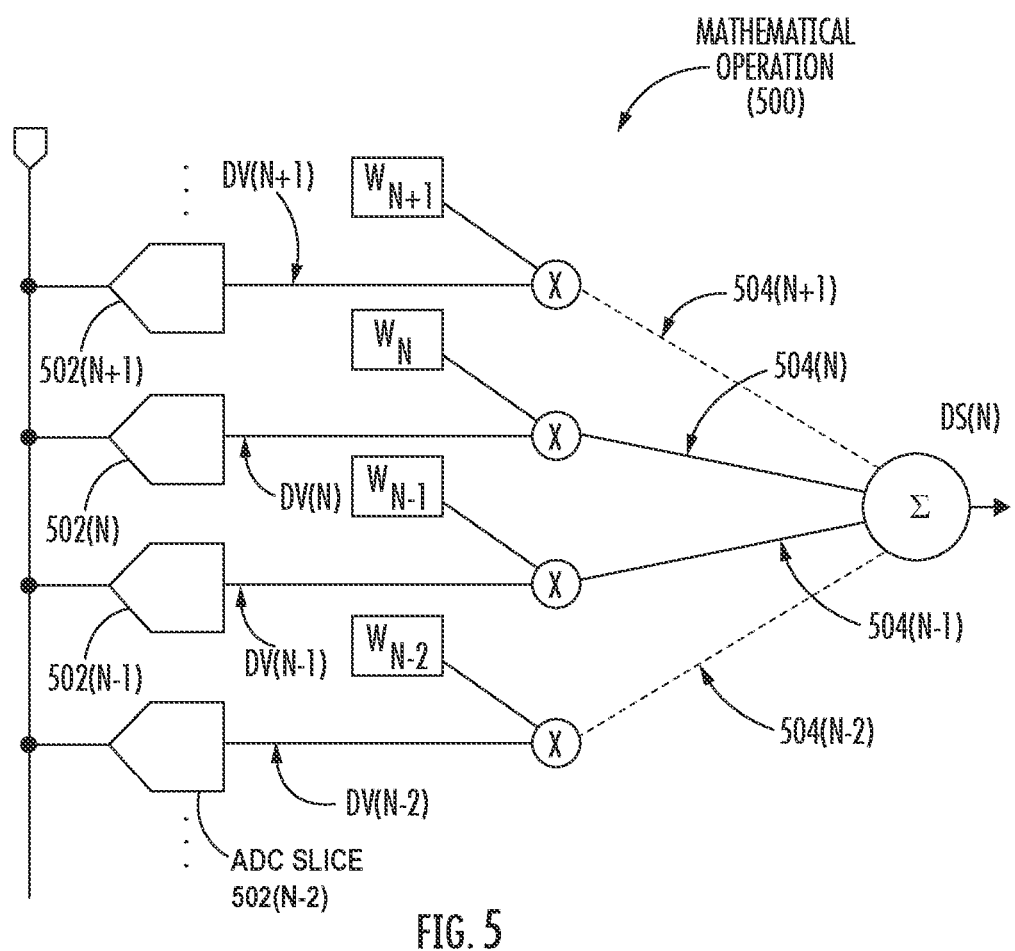
Figure 6:
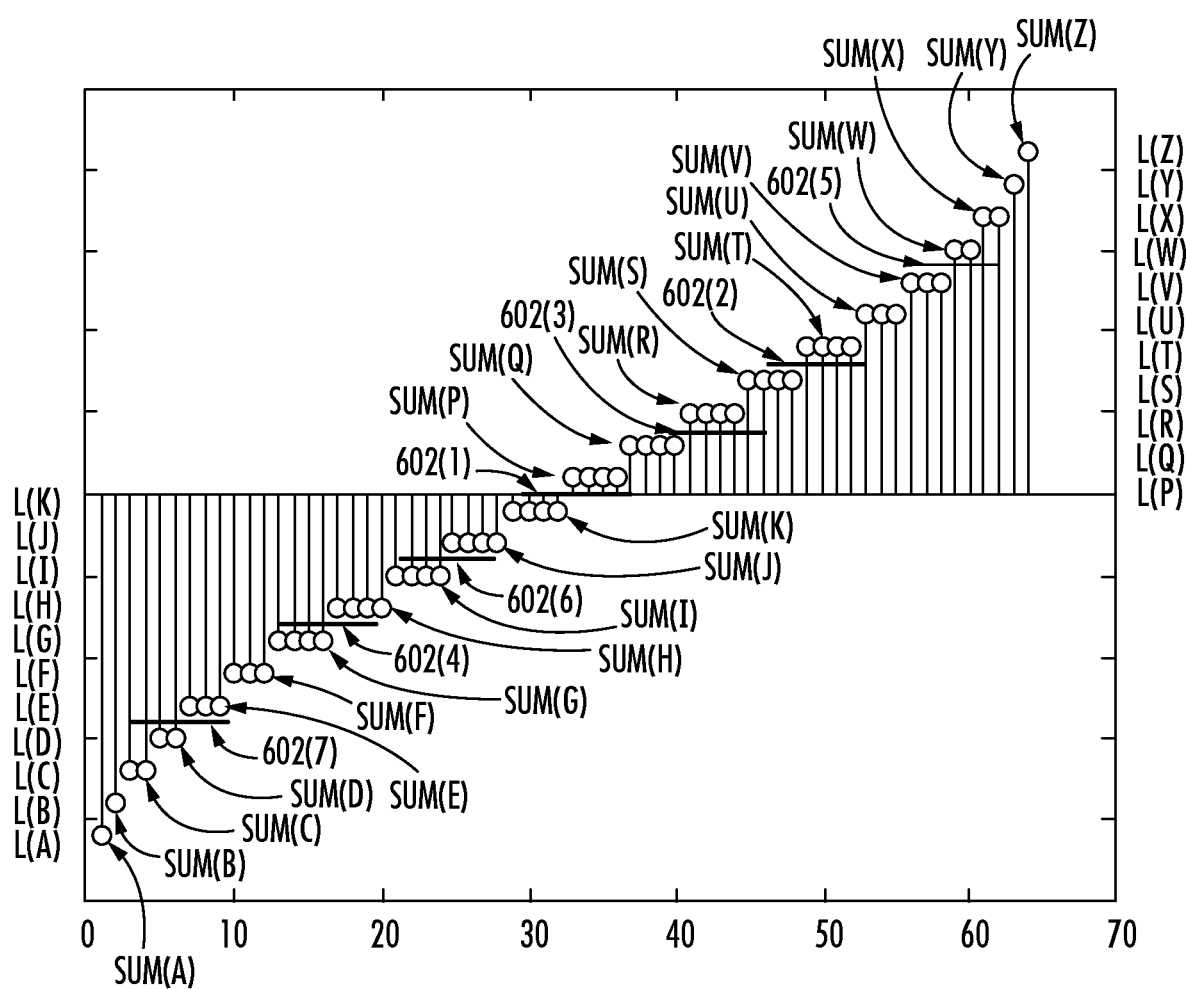
Figure 7:
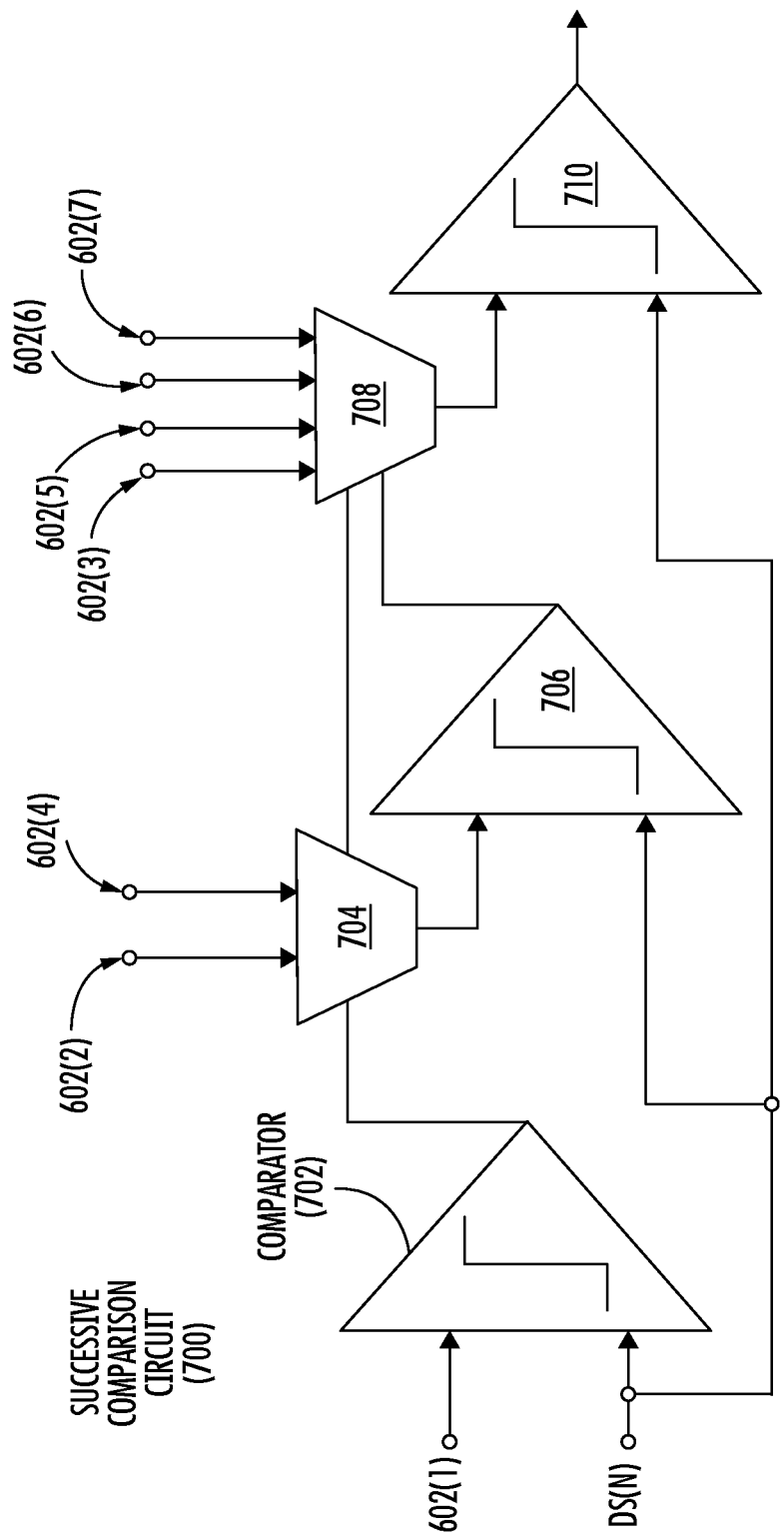
Figure 9:
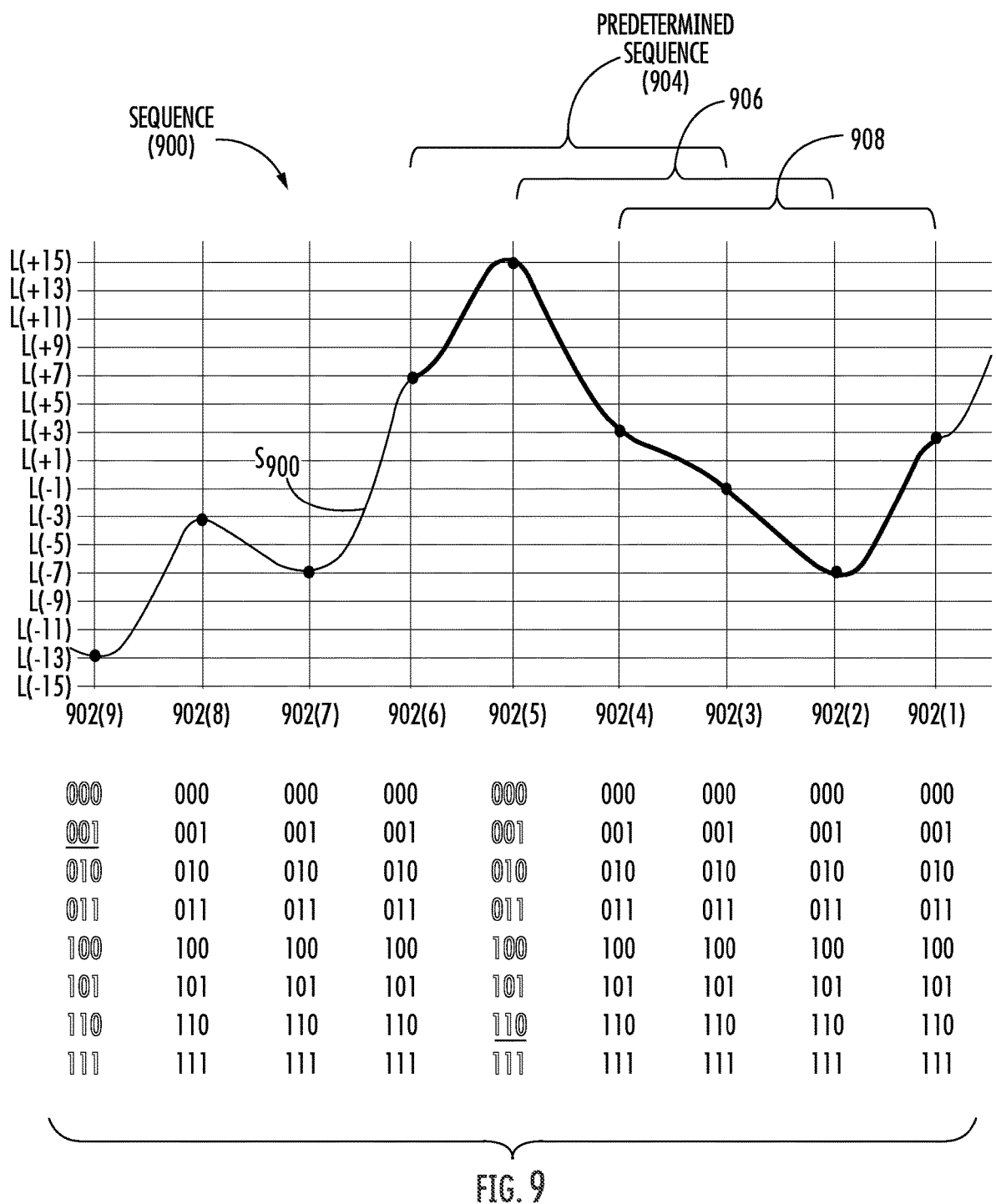
Figure 10:
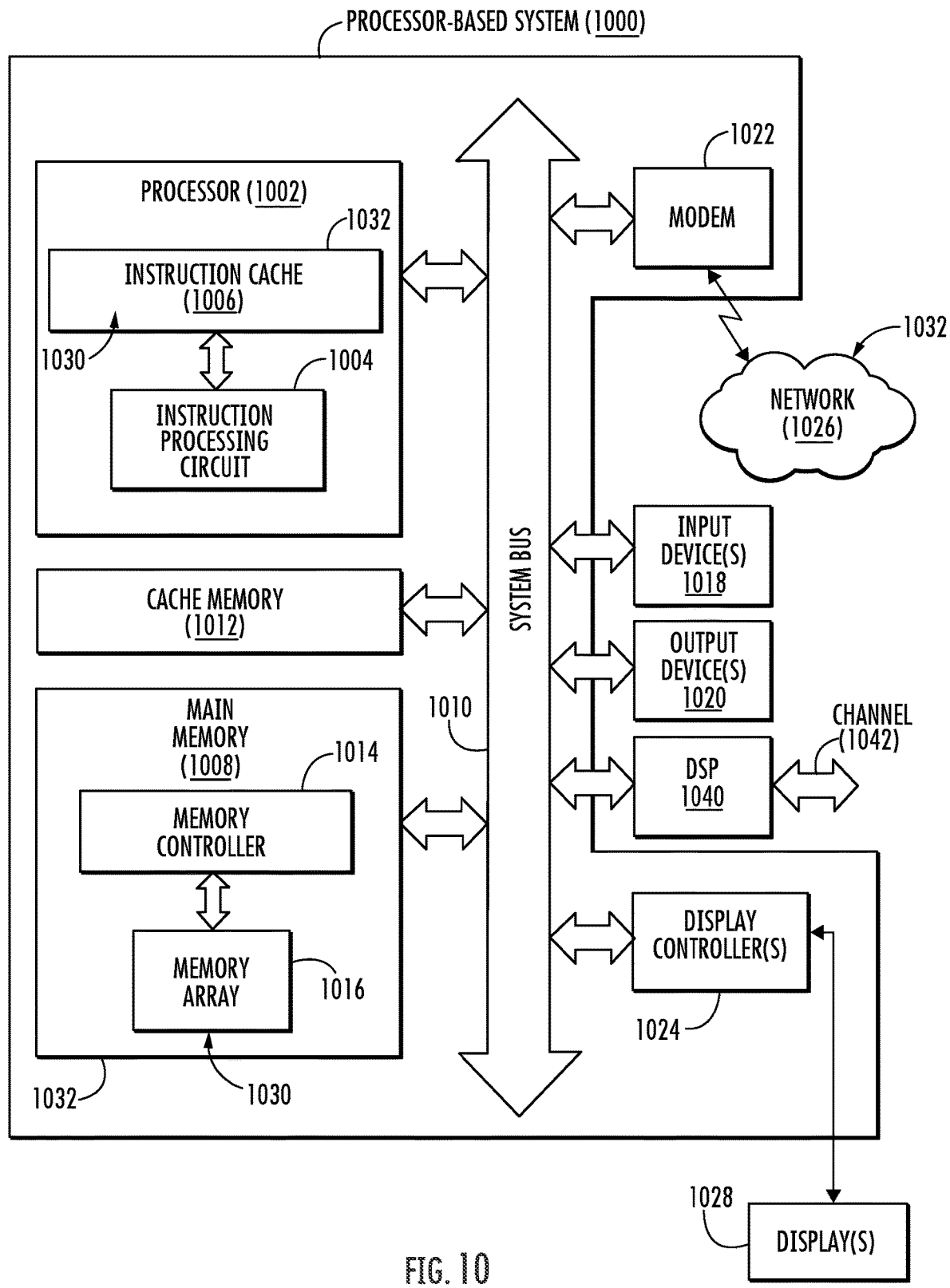

FIG. 4 includes diagrams illustrating digital sums in which various adjacent UIs (taps) are included and for different resolutions of PAM encoding;

FIG. 5 is a functional diagram of a mathematical operation applying respective weights to digital voltages of one or more taps generating a digital sum in the feed-forward equalizer (FFE) circuit;

FIG. 6 is a diagram showing a range of levels of digital sums to illustrate the decision feedback equalizer (DFE) circuit determining a level of a first digital sum;

FIG. 7 is a schematic diagram of a circuit in the DFE for determining a level of a digital sum in a range of digital sums by successively comparing the digital sum to reference sums in smaller portions of the range;

FIG. 8 is an illustration of a look-up table for identifying at least one predetermined sequence associated with each level in the range of digital sums in FIG. 6;

FIG. 9 is an illustration of one example of a predetermined sequence of levels corresponding to digital sums of consecutive UIs; and FIG. 10 is a block diagram of an exemplary processor-based system including a plurality of devices coupled to a system bus, wherein one or more devices include a DSP for determining data received in a PAM encoded analog signal.

DETAILED DESCRIPTION

With reference to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Exemplary aspects disclosed herein include digital signal processors (DSPs) providing scalable decision feedback equalization employing sequence selection. Related methods of decoding digital data are also disclosed. A digital equalizer circuit employs an analog-to-digital-converter (ADC) to determine a digital voltage in each unit interval (UI) of an analog signal and employs a DSP to decode digital data encoded in each UI based on the digital voltage. The DSP includes a feed-forward equalizer (FFE) that generates a digital sum based on weighted digital voltages of a first UI and an adjacent UI. An exemplary DSP disclosed herein includes a decision feedback equalizer (DFE) circuit that determines a first level of the digital sum of the first UI, identifies at least one predetermined sequence of levels of consecutive UIs that include the first level, and selects one of the predetermined sequences to decode the digital data. In some examples, the first level of the digital sum is one of a discrete number of levels corresponding to possible values of the digital sum, and the at least one predetermined sequence comprises the levels of digital sums in known sequences of consecutive UIs. Based on the first level, the predetermined sequences may be identified in a look-up table. In some examples, the DSP is programmed to add weighted digital voltages of additional adjacent UIs to generate the digital sum of the first UI. The exemplary DFE avoids long critical paths caused by look-ahead subtraction circuits and high fan-in multiplexors used in conventional DSPs.

Figure 1:
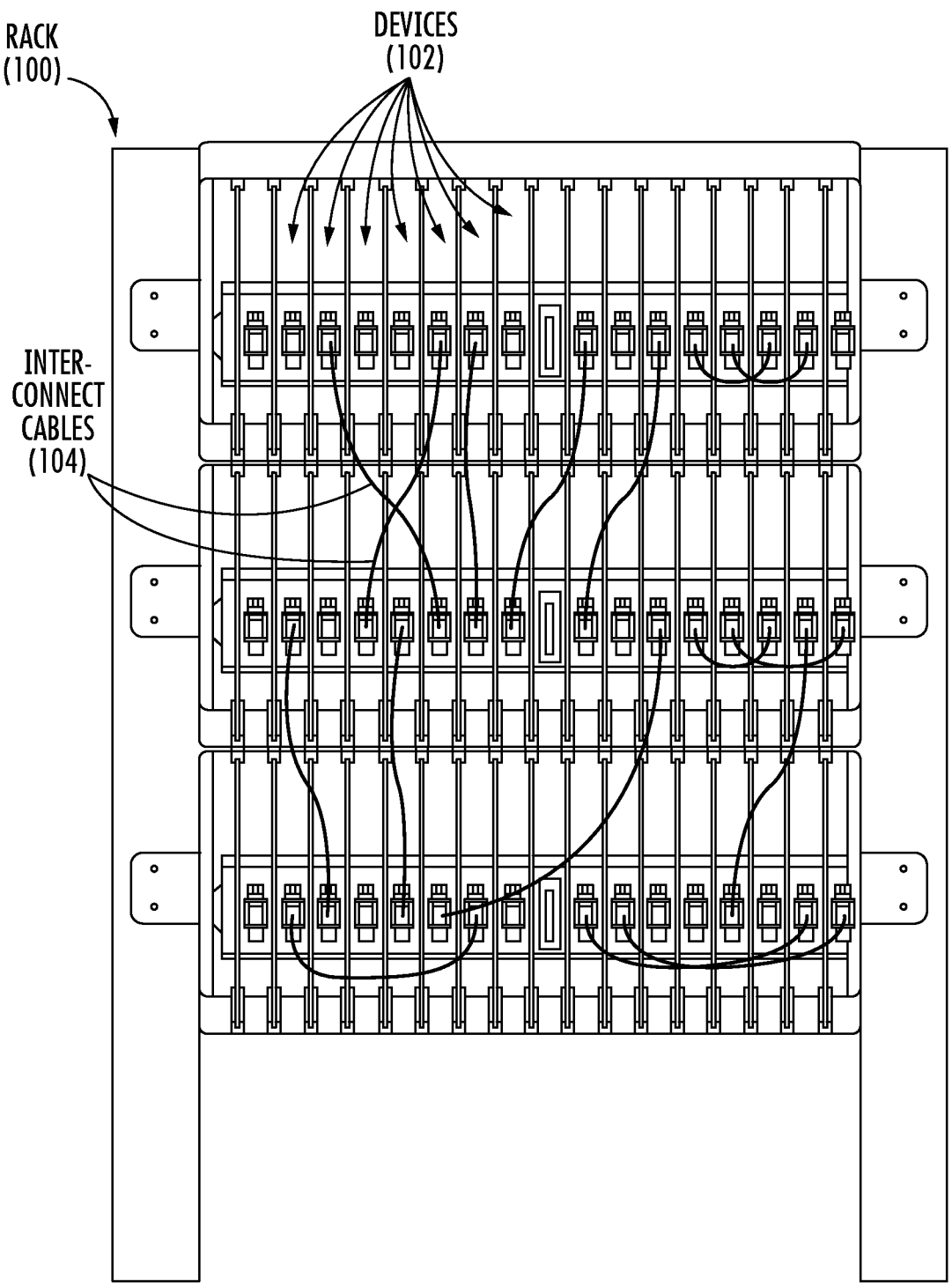
FIG. 1 is a schematic diagram of a rack of processing devices interconnected by channels that transfer data encoded by phase-amplitude modulation (PAM)

Before describing an exemplary digital equalizer 300, with reference to FIGS. 3-9, an example of devices employing digital equalizers is shown in FIG. 1, and a functional diagram of a conventional digital equalizer 200 is discussed with reference to FIG. 2. FIG. 1 is an illustration of a rack 100 of devices 102 viewed from the backside of the devices 102 to show interconnect cables 104 interconnecting the devices 102 a short distance apart (e.g., from several inches to a few feet). The devices 102 transfer digital data over the interconnect cables 104 for processing or storage. The interconnect cables 104 may be single-ended or differential channels. In some methods of wired communication, each binary digit or bit of the exchanged digital data is indicated as a voltage of an analog signal on the interconnect cable 104 during a UI. A duration of the UI may be one period of a periodic clock signal associated with the analog signal. For example, a high voltage (e.g., 2 volts) of a range of voltage on the interconnect cables 104 during one UI may indicate a binary "1," and a low voltage (e.g., 0 volts) of the range may indicate a binary "0".

Reducing the duration of each UI (i.e., increasing the frequency of the periodic clock signal) is one way to send more data (e.g., bits) per second, thereby increasing a rate of digital data transmission. However, reducing the UI duration also reduces the time available to change the voltage on the interconnect cable 104 from one voltage level in one UI to another voltage level in the next UI. A higher periodic clock frequency also allows less time in each UI during which the voltage is stabilized for evaluation. Furthermore, increasing the frequency of an analog signal increases the losses incurred due to frequency-dependent attenuation in the channel over which the analog signal is transmitted. Consequently, increasing the digital data transmission rate in this manner causes an increase in the bit error rate (BER) between devices. Recovering from such errors can effectively reduce data transmission rates.

Pulse amplitude modulation (PAM) is a method of encoding data as a pulse amplitude (e.g., voltage) of an analog signal and can be used to increase the amount of information that is transferred over the interconnect cable 104 in each UI without BER increases caused by higher frequencies. As noted above, PAM can be used to encode a voltage on an analog signal to one of two values (e.g., "0" or "1") (PAM-2 or NRZ). PAM can also be used to encode an analog signal to four, six, or eight values (i.e., known as PAM-4, PAM-6, and PAM-8) which are increasing levels of the density of the digital data that may be included in each UI. In further detail, encoding data on a voltage of an analog signal to one of two values (e.g., "0" and "1") can include using a low voltage in a voltage range of the analog signal to represent one of the two values (e.g., "0") and using a high voltage to represent the other one of the two values (e.g., "1"). In this example, for an analog signal voltage range of 2.0 volts, a voltage less than 1.0 may represent a binary "0," and a voltage greater than 1.0 may represent a binary "1". Alternatively, encoding data in a voltage of an analog signal to one of eight (8) values (e.g., "0" to "7"), to transmit more information per cycle, can include dividing the voltage range of the analog signal into eight (8) sub-ranges, where the digital data may be identified by the sub-range in which the voltage is detected. For example, with a voltage range of 2.0 volts to represent eight (8) possible values, a voltage less than 0.25 volts may represent a "0" (e.g., binary "000"), and a voltage between 0.25 and 0.5 volts may represent a "1" (e.g., binary "001"), and a voltage between 1.75 and 2.0 volts can represent a "7" (e.g., binary "111"). Using PAM-8, data can be transmitted at the same rate as data is transmitted using PAM-2, but the analog signal frequency using PAM is one-fourth (¼) of the frequency needed for PAM 2. However, correctly determining the value represented by the voltage in PAM-8 can become more difficult as the voltage range is divided into smaller sub-ranges, which increases the difficulty of accurately determining the data being received in each UI, which can increase the BER.

Figure 2:
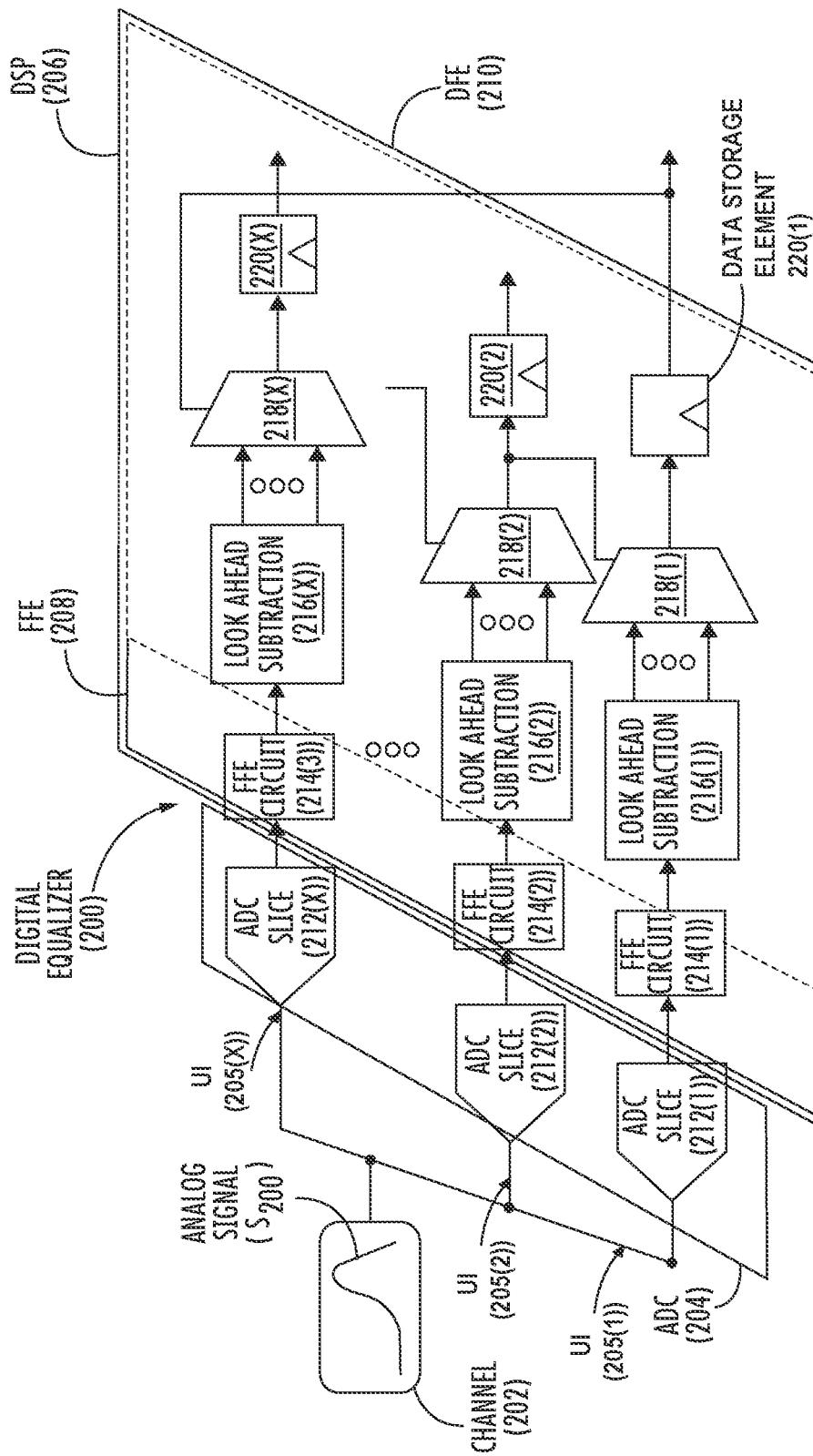
FIG. 2 is a functional block diagram of a conventional digital equalizer, including an analog to digital converter (ADC) and a conventional digital signal processor (DSP)

FIG. 2 is a functional diagram of a conventional digital equalizer 200 used to decode digital data that is encoded in an analog signal $S_{200}$ transmitted through a channel 202. Data is encoded in the analog signal $S_{200}$ as a voltage in each UI. The conventional digital equalizer 200 includes an ADC 204 and a DSP 206. The DSP 206 includes an FFE 208 and a DFE 210 to equalize or compensate for frequency-dependent attenuation of the analog signal $S_{200}$ in the transmission channel 202. The ADC 204 generates digital voltages DV(0)-DV(X), which are digital values indicating the amplitudes of the voltages of the analog signal $S_{200}$ during each UI in a series of UIs (e.g., UI 205(1)-205(X)).

A voltage of the analog signal $S_{200}$ is captured during a UI (e.g., in the "eye" of the UI) in the ADC 204. For an analog signal $S_{200}$ with a frequency in the gigahertz (GHz) range, the duration of a UI 205(1) of the analog signal $S_{200}$ may be a fraction of a nanosecond during which a voltage is captured, and the digital voltage DV(1) is determined, for example. Since determination of the digital voltage DV(1) may take significantly longer than a UI, the ADC 204 comprises ADC slices 212(1)-212(X) to capture sequential voltages of the analog signal $S_{200}$ in UIs 205(1)-205(X) in a round-robin manner.

In an example, the time for one of the ADC slices 212(1)-212(X) to generate the digital voltage DV(1) may be sixty-four (64) times the period of the UI 205(1). In such a case, the first ADC slice 212(1) captures the voltage in the UI 205(1), the second ADC slice 212(2) captures the voltage in the second UI 205(2), and so on, to the $64^{th}$ ADC slice 212(X) capturing the voltage of the $64^{th}$ UI 205(X) (where X=64). After the UI 205(64), the first ADC slice 212(1) generates the digital voltage DV(1), indicating the voltage in the first UI 205(1), and starts again by capturing the voltage of the analog signal $S_{200}$ in the UI 205(X+1) (e.g., UI 205(65)). In one example, each of the ADC slices 212(1)-212(X) may be successive approximation register (SAR) logic circuits.

The ADC slices 212(1)-212(X) provide the digital voltages DV(1)-DV(X) to the FFE 208, which includes respective FFE circuits 214(1)-214(X). Each of the FFE circuits 214(1)-214(X) receives the digital voltages DV(1)-DV(X) of a corresponding UI and at least one adjacent UI. For example, the FFE circuit 214(5) may receive the digital voltage DV(5) generated in the ADC slice 212(5) for the UI 205(5) and also receive the digital voltage DV(4) from the UI 205(4). In this example, the UI 205(5) is the "target UI," and the UI 205(4) is an adjacent UI that preceded the target UI. The term "target UI" here refers to a UI in which the analog signal $S_{200}$ is being decoded, and the UIs immediately preceding and following (or near, e.g., within UIs) the target UI are referred to as "adjacent UIs."

The FFE circuits 214(1)-214(X) generate digital sums DS(1)-DS(X) based on the digital voltages of the UIs 205(1)-205(X) and UIs adjacent to the UIs 205(1) and 205(X). In the example above, the FFE circuit 214(5) may generate the digital sum DS(5) based on the digital voltages DV(4) and DV(5) from UIs 205(4) and 205(5) and may also include digital voltages from one to several (e.g., ten or more) other UIs, such as the digital voltage DV(3) from UI 205(3), for example. The digital voltages DV(3)-DV(5) used by the FFE circuit 214(5) to generate the digital sum DS(5) may also be referred to as "taps." The taps are the digital voltages DV(1)-DV(X) of the target UI and UIs adjacent to or near to (preceding and/or following) the target UI. Each of the digital sums DS(1)-DS(X) is a weighted sum of a set of taps, which is a subset of the digital voltages DV(1)-DV(X). The impact of each tap or digital voltage on a digital sum is provided as a weighted digital voltage based on the digital voltage multiplied by a weight or coefficient. Each of the digital sums DS(1)-DS(X) is a sum of weighted digital voltages. The weight coefficients of taps might be additive or subtractive, depending on whether addition or subtraction is needed to cancel the inter-symbol interference (ISI) on the target UI, for example.

The digital voltages of adjacent UIs are used in addition to the digital voltage of the target UI to generate the digital sums DS(1)-DS(X) because the voltages of an analog signal in adjacent UIs can affect a target UI just as a target UI can affect the voltage in adjacent UIs. For example, if the analog signal $S_{200}$ is driven with a voltage of 2.0 volts in a first UI 205(N) and a third UI 205(N+2), but a voltage of 0 volts is driven in the second UI 205(N+1) (between the first UI and third UI), the voltage of the analog signal $S_{200}$ received at the DSP 206 may not have time to settle to 0 volts in the second UI 205(N+1) before being increased again, and may not reach 2.0 volts in the third UI 205(N+2), depending on the voltage of a subsequent UI and channel characteristics.

In the conventional digital equalizer 200 in FIG. 2, the DFE 210 provides further equalization to address characteristics of the channel 202 and may include look-ahead subtraction logic 216(1)-216(X) to decode the digital data from the digital sums DS(1)-DS(X). The look-ahead subtraction logic 216(1)-216(X) of the DFE 210 relies on high input multiplexors 218(1)-218(X) that create long critical timing paths to data storage elements 220(1)-220(X). As the granularity or density of the digital data encoded in a UI increases, the quantity of logic increases dramatically. For example, as the number of inputs of the multiplexors increases, there is an increase in the number of levels of multiplexing, which further increases delays in the critical timing paths through the DFE 210. An increase in circuitry may also cause a significant increase in power consumption in the DSP 206. Thus, when attempts are made to advance from encoding digital data with a density per UI of 2 possible values (e.g., 0 and 1), as in PAM-2 or NRZ, to encoding digital data with more possible values (i.e., a higher density), such as PAM-4, PAM-6, or PAM-8, conventional digital equalizers like digital equalizer 200 may suffer from significant timing delays, and/or excessive power consumption.

Figure 3:
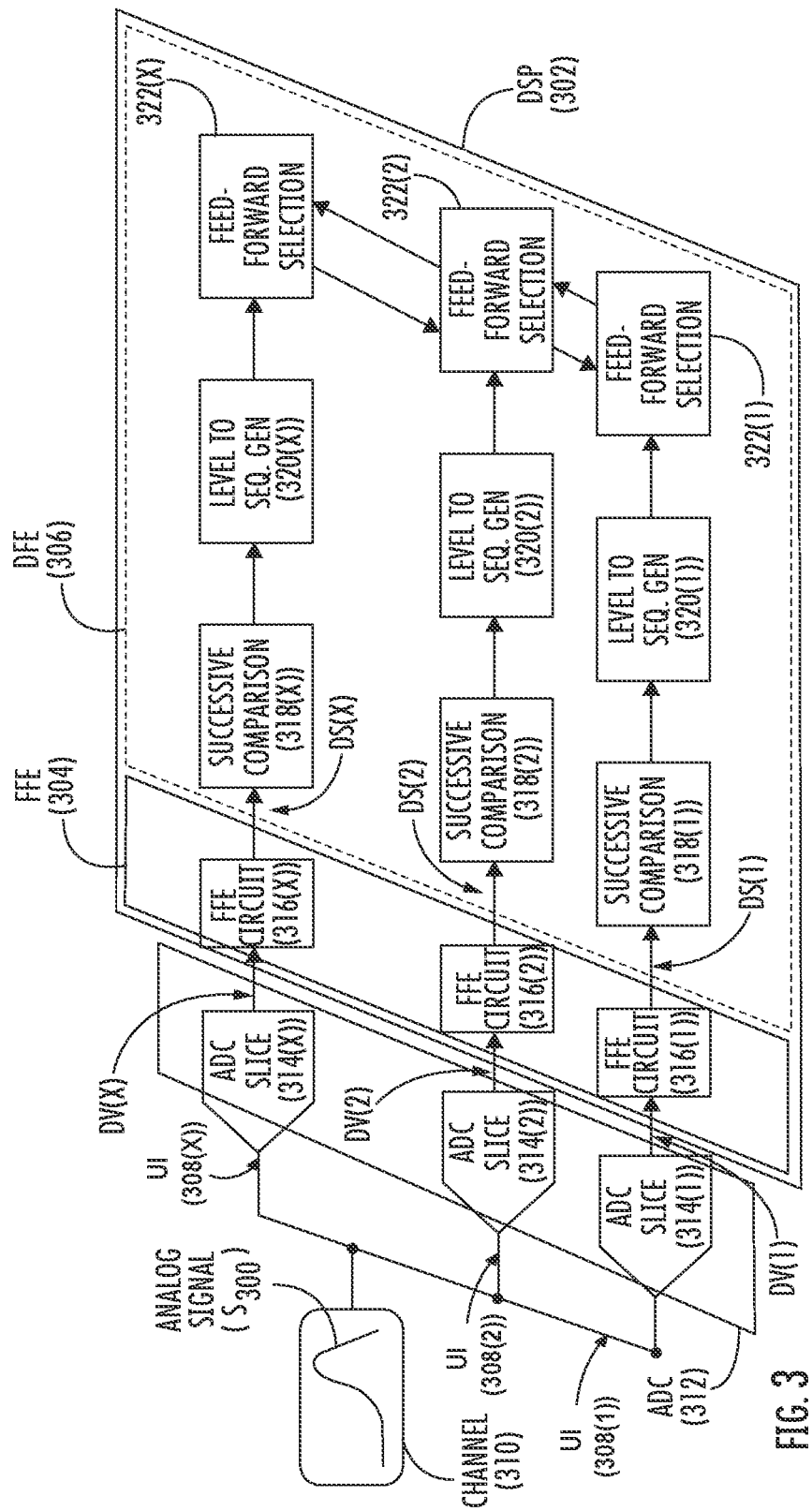
FIG. 3 is a functional block diagram of an exemplary digital equalizer circuit, including an ADC and a DSP circuit that decodes digital data received in an analog signal in a first unit interval (UI) based on a selected predetermined sequence of levels including a level corresponding to the first UI.

FIG. 3 is a functional block diagram of an exemplary digital equalizer 300 with a DSP 302. The DSP 302 includes an FFE 304 and a DFE 306. The FFE 304 produces digital sums DS(1)-DS(X) for UIs 308(1)-308(X) of the analog signal S300 received in channel 310, as discussed above. The UIs 308(1)-308(X) are unit intervals of time during which a voltage of the analog signal $S_{300}$ is captured by an ADC 312. The DFE 306 decodes digital data received in the UIs 308(1)-308(X) based on predetermined sequences of levels of the digital sums DS(1)-DS(X) of consecutive UIs. The predetermined sequences include levels of the magnitudes of digital sums that a produced in known sequences of consecutive UIs based on the received analog signal $S_{300}$ and the characteristics of the channel 324, as explained further below.

The ADC 312 includes ADC slices 314(1)-314(X) to capture the voltages on the analog signal $S_{300}$ in the UIs 308(1)-308(X) and to convert the analog voltages to digital voltages DV(1)-DV(X). The ADC 312 and ADC slices 314(1)-314(X) correspond to the ADC 204 and ADC slices 212(1)-212(X) in FIG. 2 as described fully above and are not described further here. The FFE 304 includes FFE circuits 316(1)-316(X) that receive the digital voltages DV(1)-DV(X) on a channel 310 and generate the digital sums DS(1)-DS(X). The DFE 306 includes successive comparison circuits 318(1)-318(X) that determine levels corresponding to the digital sums DS(1)-DS(X), as explained with reference to FIGS. 6 and 7. The DFE 306 includes level-to-sequence generation circuits 320(1)-320(X) that identify predetermined sequences that include the determined levels of known sequences of consecutive UIs, as explained with reference to FIGS. 6 and 8. The DFE 306 also includes feed-forward selection circuits 322(1)-322(X) that exchange indications of selected sequences for adjacent UIs 308(1)-308(X). A predetermined sequence of levels is described with reference to FIG. 9.

FIG. 4 includes diagrams 400A-400D illustrating the digital sums DS(1)-DS(X) of FIG. 3, including various configurations of taps (i.e., adjacent UIs) and resolutions of PAM encoding. Diagram 400A illustrates digital sums DS(N+1), DS(N), DS(N−1), and DS(N−2) for the UIs 404(N−2) through 404(N+1). In PAM-4 encoding, the voltage of the analog signal $S_{300}$ is encoded to represent one of four possible values, which can represent two binary digits (i.e., 00, 01, 10, and 11). Here, the two bits B(1) and B(2) are encoded as a voltage in UI 404(N−2), the bits B(3)-B(4) are encoded in UI 404(N−1), the bits B(5)-B(6) are encoded in UI 404(N), and the bits B(7)-B(8) are encoded in UI 404(N+1).

In an example in which the voltage range of the analog signal $S_{300}$ is 2.0 volts, voltages less than 0.5 volts may be interpreted as "00", voltages between 0.5 volts and 1.0 volts may be interpreted as "01", voltages between 1.0 and 1.5 volts may be interpreted as "10", and voltages above 1.5 volts may be represented as "11". However, as previously noted, the voltage in a UI is affected by the voltages in adjacent UIs (e.g., UIs immediately preceding or following). Thus, a voltage of 1.5 volts, which could indicate either a "10" or an "11", may be more accurately interpreted based on consideration of the voltages of adjacent UIs. In this example, if the previous UI was 2.0 volts, a voltage of 1.5 volts in a target UI may be determined to represent a digital "10", but if the immediately preceding UI was 0.1 volts, a voltage of 1.5 volts in the target UI might be determined to represent a digital "11."

As previously noted, a "00" may be indicated by any voltage less than 0.5 volts but a digital granularity or resolution of the digital voltages DV(1)-DV(X) may vary based on design preference. In other words, the digital voltages DV(1)-DV(X) in a PAM-4 design may be represented by as few as two (2) bits (e.g., "00", "01", "10", and "11") to indicate one (1) of the four (4) values of PAM-4 encoding, but the digital voltages DV(1)-DV(X) generated by the ADC slices 314((1)-314(X) may have a higher number of bits to provide higher resolution, which may be useful in determining an encoded digital data when the voltages of adjacent UIs are considered.

A target UI is not only affected by the voltage of a UI immediately preceding the target UI. The voltages of other UIs that are adjacent to or near to the target UI may also affect the voltage of the target UI, though they may do so to a lesser extent. These relative effects can be accounted for by the weight coefficients. The terms "adjacent UIs" and "near UIs" include one or more UIs immediately preceding or immediately following the target UI and may also include UIs not immediately preceding or immediately following the target UI.

Returning to diagram 400A, in this example, the digital sum DS(N) (generated for the UI 404(N)) is based on the voltages of UIs 404(N−2) and 404(N−1), which precede the UI 404(N) in time, the voltage of the UI 404(N) (the target UI), and also based on the voltage of UI 404(N+1), which immediately follows the target UI 404(N). In practice, the digital sum DS(N) can be determined based on the voltages of a much larger number of UIs (e.g., a larger number of taps). In some examples, the digital sum DS(N) may be determined by up to ten (10), twenty (20), or more taps (digital voltages DV(1)-DV(X)). However, the DS(N) is processed to remove the influences of all but a small set of taps that have the greatest impact or contribution to the digital sum. Coefficients 406(N−2), 406(N−1), 406(N), and 406(N+1) (also referred to herein as "weight coefficients") indicate a relative weight of each of the respective voltages that influence the digital sum DS(N). The respective weights also indicate an influence each tap has on the voltage of the target UI. In some examples, a sum of all the coefficients 406(N−2), 406(N−1), 406(N), and 406(N+1) equals 1, meaning that each of the coefficients is a fractional value less than 1. Alternatively, a sum of the weight coefficients may be greater than 1. Diagram 400A indicates a relative weight (e.g., magnitude) of the coefficients 406(N−2), 406(N−1), 406(N), and 406(N+1) by their respective heights.

The digital sum DS(N) is based on the coefficients 406 (N−2), 406(N−1), 406(N), and 406(N+1), respectively, and the digital voltages DV(N−2), DV(N−1), DV(N), and DV(N+1) of the analog signal $S_{300}$, in UIs 404(N−2) and 404(N+1) to generate respective products, also referred to as weighted voltages.

Diagram 400B is an example of a signal encoded with PAM-6 or PAM 8, where each voltage of a UI is encoded to represent one of six (6) or eight (8) possible values, respectively. Here, the voltage of UI 408(N−1) represents bits B(3)-B(5), and the voltage of UI 408(N) represents bits B(6)-B(8). In this example, the digital sum DS(N) (for UI 408(N)) is generated using a single tap from the UI 408(N−1) immediately preceding the target UI 408(N), and the relative magnitudes of the coefficients 410(N) and 410(N−1) shown.

Diagram 400C is another example of PAM-6 or PAM 8, where the digital sum DS(N) is generated using two taps UI 412(N−1) and UI 412(N−2), immediately preceding the target UI 412(N). Here, the voltage of UI 412(N−2) represents bits B(0)-B(2), the voltage of UI 412(N−1) represents bits B(3)-B(5), and the voltage of UI 412(N) represents bits B(6)-B(8). An example of relative weights of the coefficients 414(N), 414(N−1), and 414(N−2) are shown. A larger number of taps may increase the accuracy of the digital sum DS(N) (e.g., compared to 400B), but processing a larger number of taps increases the complexity of the processing circuits and increases delay.

Diagram 400D is another example of PAM-6 or PAM 8 in which the digital sum DS(N) is generated using a voltage from a UI 416(N−1) immediately preceding the target UI 416(N) and a voltage from a UI 416(N+1) immediately following the target UI 416(N). An example of the relative magnitudes of the coefficients 418(N−1), 418(N), and 418 (N+1) are shown. Comparing the example in diagram 400D to the example in diagram 400C, if it is determined that a UI 416(N+1) immediately following a target UI 418(N) has more influence than a UI 416(N−2) (not shown), the example in diagram 400D may provide greater accuracy with the same amount of circuitry as the example in diagram 400C.

In the above examples, DS(N) can be any of DS(1)-DS(X) based on the digital voltages DV(1)-DV(X) received from ADC slices 314(1)-314(X). It should be understood that in the example in diagram 400C, in the case in which DS(N) is DS(1), the digital voltage DV(N−2) would be the digital voltage DV(X−1), and the digital voltage DV(N−1) would be the digital voltage DV(X) from UIs 412(X−1) and 412(X) because capturing of the voltages of the analog signal $S_{300}$ "wraps" from ADC slice 314(X) back to ADC slice 314(1) in the round-robin method of the ADC slices 314(1)-314(X).

The FFE 304 can be programmed to include any of the different numbers and configurations of taps for generating the digital sums DS(1)-DS(X) shown in diagrams 400A-400D and is not limited to such configurations. In other words, the FFE 304 may be programmed to employ more or fewer taps from UIs immediately preceding or following the target UI or near the target UI to generate the digital sums DS(1)-DS(X).

FIG. 5 is a functional diagram of a mathematical operation 500 in the FFE 304 for applying weight coefficients to a plurality of taps to generate weighted products and summing the weighted products to determine the digital sum DS(N) in a UI 408(N). The digital voltage DV(N−2) generated in an ADC slice 502(N−2) is multiplied by a weight coefficient $W_{N-2}$ to generate a product (weighted sum) 504(N−2). The digital voltage DV(N−1) from ADC slice 502(N−1) is multiplied by a weight coefficient $W_{N-1}$ to generate product 504(N−1). The digital voltage DV(N) from ADC slice 502(N) is multiplied by a weight coefficient $W_N$ to generate product 504(N). The digital voltage DV(N+1) from ADC slice 502(N+1) is multiplied by a weight coefficient $W_{N-1}$ to generate product 504(N+1). The products 504(N−2)-504(N+1) are added to generate the digital sum DS(N). As discussed above, the mathematical operation 500 shown in FIG. 5 may include more or fewer products added together to generate the digital sum DS(N) depending on the programming of the FFE 304, which may include different tap configurations (e.g., voltages of more or fewer adjacent UIs). For example, the digital sum DS(N) may be a weighted sum of digital voltages of any number of UIs (e.g., up to 20 or more), but a smaller set is used in this description for simplicity.

The digital sums DS(1)-DS(X) are based on the digital voltages DV(1)-DV(X) and the weight coefficients $W_{N-2}$, $W_{N-1}$, $W_N$, and $W_{N+1}$ (and any other weight coefficients that may be employed according to the programming of the FFE 304). The weight coefficients $W_{N-2}$, $W_{N-1}$, $W_N$, and $W_{N+1}$ are also provided as digital values. Thus, there are a finite number of binary values that may be used to represent each of the digital sum DS(1)-DS(X) based on the granularity (i.e., number of bits) of the digital voltages DV(1)-DV(X) generated in the ADC slices 314(1)-314(X), and on the weight coefficients $W_{N-2}$, $W_{N-1}$, $W_N$, and $W_{N+1}$. In other words, the mathematical operation 500 generates digital sums with one of a discrete number of values based on possible combinations of the weight coefficients $W_{N-2}$, $W_{N-1}$, $W_N$, and $W_{N+1}$ and the digital voltages DV(1)-D(X). The DFE 306 determines a level corresponding to each of the digital sums DS(1)-DS(X) within the range of values, as described with respect to FIG. 6.

FIG. 6 is a diagram 600 showing an example of levels L(A)-L(K) and L(P)-L(Z) that each corresponds to one of the possible values of the digital sum DS(N) in FIG. 5. A method for determining a level corresponding to the digital sum DS(N) is described here with reference to FIG. 6 by way of an example of the digital sum DS(N), which may be any of the digital sums DS(1)-DS(X).

As noted above, the digital sum DS(N) has a discrete or finite number of possible values based on the resolution (e.g., number of bits) used to represent the digital voltage DV(N) and the weight coefficients (e.g., $W_N$, $W_{N-1}$) FIG. 6 illustrates an example in which the value of the digital sum DS(N) can be one of twenty-two (22) possible values, which are designated here as SUM(A)-SUM(K) and SUM(P)-SUM(Z) corresponding to the levels L(A)-L(K) and L(P)-L(Z), respectively. Thus, the number of levels in the levels L(A)-L(K) and L(P)-L(Z) corresponds to the number of the digital sums SUM(A)-SUM(K) and SUM(P)-SUM(Z), The DFB 306 receives the digital sum DS(1) and determines the one of the levels L(A)-L(K) and L(P)-L(Z) to which the digital sum DS(1) corresponds. The determination of a level of the digital sum DS(1) can be achieved by various methods. One method for determining a level of the digital sum DS(1) is described by an example with further reference to FIG. 6.

The digital sum DS(1) is compared to a reference sum 602(1) in the range of the digital sums SUM(A)-SUM(K) and SUM(P)-SUM(Z). As an example, the reference sum 602(1) may be a middle or median value in the range such that the digital sums SUM(A)-SUM(K) are in a portion of the range below the reference sum 602(1) and the sums SUM(P)-SUM(Z) are in a portion of the range above the reference sum 602(1). Determining whether the digital sum DS(1) is greater than or less than the reference sum 602(1) indicates whether the digital sum DS(1) is included in the portion of the range including the digital sums SUM(A)-SUM(K) or the portion of the range including the digital sums SUM(P)-SUM(Z). For example, if the digital sum DS(1) is greater than the reference sum 602(1), it can be determined that DS(1) is in the portion of the range including digital sums SUM(P)-SUM(Z), and if the digital sum DS(1) is less than the reference sum 602(1), it can be determined that DS(1) is in a portion of the range including digital sums SUM(A)-SUM(K). In this example, it is assumed that the digital sum DS(1) is greater than the reference sum 602(1), and the digital sum DS(1) is in the portion of the range including digital sums SUM(P)-SUM (Z).

Next, the digital sum DS(1) is compared to a second reference sum 602(2) in the range of digital sums SUM(P)-SUM(Z), from which it can be determined that the digital sum DS(1) is in either a portion including the digital sums SUM(P)-SUM(S) or a portion including the digital sums SUM(T)-SUM(Z). In this example, the second reference sum 602(2) may be at or near the middle of the range of the digital sums SUM(P)-SUM(Z), and the digital sum DS(1) is determined to be in the portion including digital sums SUM(P)-SUM(S).

Next, the digital sum DS(1) is compared to a third reference sum 602(3) in the range of digital sums SUM(P)-SUM(S), from which it can be determined that the digital sum DS(1) is in a portion including the digital sums SUM (P)-SUM(Q) or a portion including the digital sums SUM (R)-SUM(S).

The method continues by successively comparing the digital sum DS(1) to reference sums in progressively smaller portions of the range of digital sums SUM(A)-SUM(K) and SUM(P)-SUM(Z) until the portion that is determined to include the digital sum DS(1) has only one value, which is the digital sum DS(1). In this example, the digital sum DS(1) may be determined, in a final comparison, to be in the portion including only the digital sum SUM(Q). The digital sum DS(1) is determined to be at the level L(Q) corresponding to the digital sum SUM(Q). The reference sums 602(1)-602(3) and any other reference sums employed in this method may be among the digital sums SUM(A)-SUM(K) and SUM(P)-SUM(Z) or may be other digital sums having values between adjacent ones of the digital sums SUM(A)-SUM(K) and SUM(P)-SUM(Z).

FIG. 7 is a schematic diagram of a circuit 700 corresponding to the successive comparison circuits 318(1)-318(X) in the DFE 306 in FIG. 3 for determining the one of the levels L(A)-L(K) and L(P)-L(Z) corresponding to a target digital sum DS(N). In the circuit 700, a first comparator 702 compares the digital sum DS(N) to the reference sum 602(1). Based on the output of the first comparator 702, a multiplexor 704 determines whether a second comparator 706 compares the digital sum DS(N) to the reference sum 602(2) greater than the reference sum 602(1) or to a reference sum 602(4) less than the reference sum 602(1). Based on the output results of the first comparator 702 and the second comparator 706, a second multiplexor 708 determines whether a third comparator 710 compares the digital sum DS(N) to the reference sum 602(3), a reference sum 602(5), a reference sum 602(6), or a reference sum 602(7). The circuit 700 represents a portion of the circuit that would be employed to determine the one of the levels L(A)-L(K) and L(P)-L(Z) to which the target digital sum DS(N) corresponds. Persons of skill in the art would understand that additional stages are needed in the circuit 700, and the number of additional stages depends on the number of levels, which equates to the number of values that are possible for the digital sums DS(1)-DS(X).

The method for determining that the digital sum DS(1) corresponds to the level L(Q) in the example above may be referred to as a successive comparison method. Based on the above example, it should be understood that a level corresponding to any target digital sum DS(N) may be determined using a predictable number of comparisons depending on the number of levels. In the example in FIG. 6, including the twenty-two levels L(A)-L(K) and L(P)-L(Z), a level corresponding to a value of the digital sum DS(1) may be determined in four or five comparisons. It should be understood that the illustration of twenty-two levels L(A)-L(K) and L(P)-L(Z) is just an example. The number of possible values of the digital sum DS(1) may depend on the granularity of the digital values DV(1)-DV(X), the weight coefficient (e.g., $W_N$), and the number of taps, for example. The circuit 700 illustrates only one example of a circuit for determining which of the levels L(A)-L(K) and L(P)-L(Z) corresponds to a target digital sum DS(T).

Referring back to FIG. 6, each of the levels L(A)-L(K) and L(P)-L(Z) includes one or more indications of a predetermined sequence that includes the associated level. For example, it can be seen in FIG. 6 that the level L(Q) includes four (4) indications 604(Q)(1)-604(Q)(4), of predetermined sequences, the level L(U) includes three (3) indications 604(U)(1)-604(U)(3) of predetermined sequences, the level L(X) includes two (2) indications 604(X)(1)-604(X)(2) of predetermined sequences, and the level L(Z) includes one (1) indication 604(Z)(1) of a predetermined sequence.

FIG. 8 illustrates a look-up table 800, corresponding to the level-to-sequence generation circuits 320(1)-320(X) in the DFB 306, which is configured to store the indications of predetermined sequences associated with each of the levels L(A)-L(K) and L(P)-L(Z) shown in FIG. 6, and may also store the predetermined sequences. The indications 604(A)(1)-604(Z)(1) in FIG. 8 correspond to the indications 604(A)(1)-604(Z)(1) in FIG. 6. Continuing the example described with reference to FIG. 6 above, based on the level L(Q) of the digital sum DS(1), the look-up table 800 can be accessed to identify the at least one predetermined sequences that include the level L(Q). Corresponding to the level L(Q), the look-up table 800 includes indications in each of columns 1-4 of a predetermined sequence, including the level L(Q). A table entry may indicate the predetermined sequence by an identifier, may indicate where the predetermined sequence is stored, or may contain a predetermined sequence of levels.

The discussion below, with reference to FIG. 9, further explains the predetermined sequences. As described above, there are a finite number (e.g., 22) of values of the digital sums DS(1)-DS(X), and those values are determined by voltages detected in a target UI and UIs adjacent to the target UI, as well as the weight coefficients (e.g., $W_N$) applied to each UI. A particular value of the digital sum DS(N), for example, can be reached for one or more combinations of voltages occurring in a sequence or plurality of consecutive UIs. In the example of the three tap FFE 304 shown in FIG. 4 in diagram 400A, in which the digital sum DS(N) is determined based on the voltages in UIs 404(N−2), 404(N−1), 404(N), and 404(N+1), the digital sum DS(N) can only become the digital sum SUM(Q) at the level L(Q) in response to one or more known sequences of voltages in the UIs 404(N−2), 404(N−1), 404(N), and 404(N+1). The predetermined sequences associated with the levels L(A)-L(K) and L(P)-L(Z) are each a plurality of levels of known sequences that include the level of the digital sum at the UI 404(N). The number of levels in a predetermined sequence, which corresponds to a number of consecutive UIs, is programmable. These sequences may become known or predetermined based on the previous operation of the channel 310 and may be stored in the look-up table 800. In one example, the predetermined sequences are predetermined by the DFE 306. In another example, the look-up table 800 in the DFE 306 is configured or programmed with the predetermined sequences. The predetermined sequences are employed to determine digital data in a UI, as discussed below.

Referring back to the example of PAM-4 provided above, if the previous UI was 2.0 volts, a voltage of 1.5 volts in a target UI might be determined to represent a digital data of "10", but if the previous UI was 0.1 volts, a voltage of 1.5 volts in a target UI might be determined to represent a digital data of "11." Thus, in some predetermined sequences of consecutive UIs, a digital sum DS(1) having a first level (e.g., L(Q)) may indicate a first digital data, but in another predetermined sequence, the first level (e.g., L(Q)) may indicate a second digital data, as in the example described above. Selecting the appropriate predetermined sequence can make it possible to identify the digital data indicated by the digital sum DS(1).

In the examples in FIGS. 6 and 8, there are two, three, or four predetermined sequences that include a particular one of the levels L(C)-L(K) and L(P)-L(X). However, levels L(A), L(B), L(Y), and L(Z) are each included in only one respective predetermined sequence. Thus, for UIs in which the digital sum DS(1) corresponds to any of the levels L(A), L(B), L(Y), and L(Z), there is only one predetermined sequence of consecutive UIs for achieving such level. For a UI 404(N) in which the digital sum DS(N) is at one of the levels L(A), L(B), L(Y), and L(Z), the associated digital data is known, and the levels of consecutive adjacent UIs in the predetermined sequence can also be determined with a high degree of accuracy. The predetermined sequences of consecutive UIs overlap, and each provides a window showing the levels of a number of consecutive UIs that can be used to determine the predetermined sequences for future UIs. That is, if the predetermined sequence for an adjacent UI, for example, UI 404(N−1), is already known because the digital sum DS(N−1) corresponds to one of the levels L(A), L(B), L(Y), and L(Z)), the predetermined sequence for a target UI, such as UI 404(N), may also be determined. Then, from the selected sequence for the UI 404(N), the sequences of subsequent UIs (404(N+1)), (404(N+2)), etc., can also be identified. Thus, one of the at least one predetermined sequences associated with a level of a digital sum DS(1) in a UI can be selected based on either the level being associated with only a single predetermined sequence or a predetermined sequence selected for an adjacent UI. In this example, once the analog signal $S_{300}$ reaches any of the levels L(A), L(B), L(Y), and L(Z) in a particular UI, the digital data encoded in the analog signal $S_{300}$ in that UI can be determined with a high degree of accuracy and, the "window" of consecutive UIs provided by the predetermined sequences of levels can be advanced in time along with the analog signal $S_{300}$ to correctly select the one of the at least one predetermined sequences associated with levels of digital sums in future UIs.

FIG. 9 is a graphical representation of a sequence 900 of levels of digital sums DS(1)-DS(9) (not shown) in consecutive UIs 902(0)-902(9) of an analog signal $S_{900}$. In this example, a digital sum DS(N) of the analog signal $S_{900}$ may be any of the levels L(−15) to L(+15). As in the levels L(A), L(B), L(Y), and L(Z) in FIG. 6, levels at the extremes of the range of levels are reached in only one sequence of levels of consecutive UIs. Such a predetermined sequence of levels indicates the digital data for a UI with a high degree of accuracy. Levels of some UIs of a predetermined sequence for a target UI are shared in common with the predetermined sequence of an adjacent UI. Thus, the determination of digital data in a UI at an extreme level can be used to select the predetermined sequences for a preceding UI and a following UI, and this can be continued in each direction, as in the following example.

For example, a predetermined sequence may include the levels of two UIs prior to a target UI, the level of the target UI, and the level of one UI following the target UI. In the example in FIG. 9, the level L(+15 in UI 902(5) is known to be reached by only the predetermined sequence 904 in the sequence 900. The predetermined sequence 904 is identified (e.g., in the look-up table 800) as the only predetermined sequence having the level L(+15) in the third UI (i.e., the "target UI"). The predetermined sequence 904 is a sequence of four symbols. The impact of the sequence can be seen before and after 902(5). In this case, since 902(5) is at the highest level (L(+15)), the current symbol can be determined to be 110 level. In this example, the 111 is omitted because it is PAM-6. In PAM-6, the 000 and 111 levels aren't used. Once the symbol for 902(5) is determined, the symbols for 902(6), 902(4), and 902(3) can be determined with higher confidence. This is because a portion of each of the sequences is known with high probability. Only the sequences with the correct symbol in the corresponding location in the sequence will be possible choices. If all the sequence choices have the same symbol for the current UI, then the symbol is also known.

In this example, the level L(−1) in UI 902(3) may be reached by multiple predetermined sequences. Those predetermined sequences may be identified (e.g., by the look-up table 800 in FIG. 8) as the predetermined sequences in which the level in the third UI ("target UI" in this example) is the level L(−1). Similarly, multiple predetermined sequences may be identified based on the level L(+3) in UI 902(4). However, more information is needed to select among the multiple predetermined sequences identified for the UIs 902(3) and 902(4) to decode the digital data therein with a high degree of accuracy.

Using the overlap of a predetermined sequence of a previous UI and a predetermined sequence of a following UI, the accurate decoding determination made in one UI can be transferred to another UI. The levels of overlapping UIs make it possible to start from a UI having known digital data and move backward in time to a preceding UI or move forward in time to a following UI (e.g., as a moving window of time) to accurately select the predetermined sequences for those UIs. For example, once the digital data DS(5) is positively determined in UI 902(5), the levels of UIs 902(3)-902(5) in the predetermined sequence 904 can be used to select the predetermined sequence 906 for UI 902(4) and the digital data may be accurately decoded for UI 902(4). In the same manner, the levels of UIs 902(2)-902(4) in the predetermined sequence 906 can be used to select the predetermined sequence 908, and the digital data may be accurately decoded for UI 902(3).

In this manner, the exemplary digital equalizer 300 in FIG. 3 may be employed to decode, with a low BER, digital data encoded in the analog signal $S_{900}$. The digital equalizer 300 can be programmed to generate digital sums DS(N) comprising a desired number and configuration of taps for any of the encoding methods of PAM-2, PAM-4, PAM-6, and PAM-8, for example, without the timing delays and power consumption of conventional DSPs. Additionally, the number of UIs represented by each predetermined sequence may also be programmable in the DSP 306.

FIG. 10 is a block diagram of an exemplary processor-based system 1000 that includes a processor 1002 (e.g., a microprocessor) that includes an instruction processing circuit 1004. The processor-based system 1000 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 1000 includes the processor 1002. The processor 1002 represents one or more general-purpose processing circuits, such as a microprocessor, central processing unit, or the like. More particularly, the processor 1002 may be an EDGE instruction set microprocessor or other processor implementing an instruction set that supports explicit consumer naming for communicating produced values resulting from the execution of producer instructions. The processor 1002 is configured to execute processing logic in instructions for performing the operations and steps discussed herein. In this example, the processor 1002 includes an instruction cache 1006 for temporary, fast access memory storage of instructions accessible by the instruction processing circuit 1004. Fetched or prefetched instructions from a memory, such as a main memory 1008, over a system bus 1010, are stored in the instruction cache 1006. Data may be stored in a cache memory 1012 coupled to the system bus 1010 for low-latency access by the processor 1002. The instruction processing circuit 1004 is configured to process instructions fetched into the instruction cache 1006 and process the instructions for execution.

The processor 1002 and the main memory 1008 are coupled to the system bus 1010 and can intercouple peripheral devices included in the processor-based system 1000. As is well known, the processor 1002 communicates with these other devices by exchanging address, control, and data information over the system bus 1010. For example, the processor 1002 can communicate bus transaction requests to a memory controller 1014 in the main memory 1008 as an example of a slave device. Although not illustrated in FIG. 10, multiple system buses 1010 could be provided; wherein each system bus 1010 constitutes a different fabric. In this example, the memory controller 1014 is configured to provide memory access requests to a memory array 1016 in the main memory 1008. The memory array 1016 is comprised of an array of storage bit cells for storing data. The main memory 1008 may be a read-only memory (ROM), flash memory, dynamic random-access memory (DRAM), such as synchronous DRAM (SDRAM), etc., and/or static memory (e.g., flash memory, SRAM, etc.), as non-limiting examples.

Other devices can be connected to the system bus 1010. As illustrated in FIG. 10, these devices can include the main memory 1008, one or more input device(s) 1018, one or more output device(s) 1020, a modem 1022, and one or more display controllers 1024, as examples. The input device(s) 1018 can include any type of input device, including but not limited to input keys, switches, voice processors, etc. The output device(s) 1020 can include any type of output device, including but not limited to audio, video, other visual indicators, etc. The modem 1022 can be any device configured to allow exchange of data to and from a network 1026. The network 1026 can be any type of network, including but not limited to a wired or wireless network, a private or public network, a local area network (LAN), a wireless local area network (WLAN), a wide area network (WAN), a BLUETOOTH™ network, and the Internet. The modem 1022 can be configured to support any type of communications protocol desired. The processor 1002 may also be configured to access the display controller(s) 1024 over the system bus 1010 to control information sent to one or more displays 1028. The display(s) 1028 can include any type of display, including but not limited to a cathode ray tube (CRT), a liquid crystal display (LCD), a plasma display, etc.

The processor-based system 1000 in FIG. 10 may include a set of instructions 1030 to be executed by the processor 1002 for any application desired according to the instructions. The instructions 1030 may be stored in the main memory 1008, processor 1002, and/or instruction cache 1006 as examples of a non-transitory computer-readable medium 1032. The instructions 1030 may also reside, completely or at least partially, within the main memory 1008 and/or within the processor 1002 during their execution. The instructions 1030 may further be transmitted or received over the network 1026 via the modem 1022, such that the network 1026 includes computer-readable medium 1032.

The processor-based system 1000 in FIG. 10 may include a digital signal processor (DSP) 1040 coupled to the system bus 1010 and to a channel 1042 for communicating to other processor-based systems (not shown), such as in a rack of processing devices as shown in FIG. 1. The DSP 1040 identifies at least one predetermined sequence of levels, including a level of a digital sum that is based on a voltage of an analog signal in a UI and an adjacent UI and determines the digital data encoded in the analog signal in the UI based on a selected one of the predetermined sequences.

While the computer-readable medium 1032 is shown in an exemplary embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product or software that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, for example. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a DSP, an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from and write information to the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips that may be referenced throughout the above description may be represented by voltages, currents, electromagnetic waves, magnetic fields, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A digital equalizer circuit comprising:
   an analog to digital converter (ADC) comprising a plurality of ADC slices, each configured to determine a digital voltage in a respective unit interval (UI) of an analog signal; and
   a digital signal processor comprising:
      a feed-forward equalizer (FFE) configured to generate a first digital sum based on the digital voltage of the analog signal in a first UI and on a second digital voltage of the analog signal in a second UI adjacent to the first UI; and
      a decision feedback equalizer (DFE) comprising:
         a successive comparison circuit configured to determine a first level of the first digital sum;
         a level-to-sequence generation circuit configured to identify at least one predetermined sequence of levels of digital sums of consecutive UIs, wherein each of the at least one predetermined sequence comprises the first level; and
         a feed-forward selection circuit configured to select one of the at least one predetermined sequence,
      wherein the DFE is configured to decode digital data encoded in the analog signal in the first UI based on the selected predetermined sequence.

2. The digital equalizer circuit of claim 1, wherein the FFE is further configured to:
   receive the digital voltage for the first UI from a first one of the plurality of ADC slices;
   multiply the digital voltage by a first coefficient to generate a first product;
   receive the second digital voltage for the second UI from a second one of the plurality of ADC slices;
   multiply the second digital voltage by a second coefficient to generate a second product; and
   add the first product and the second product to generate the first digital sum.

3. The digital equalizer circuit of claim 2, the FFE further configured to be programmed to:
   receive at least a third digital voltage from at least a third one of the plurality of ADC slices for at least a third UI adjacent to one of the first UI and the second UI;
   multiply each of the at least third digital voltage by a corresponding coefficient to generate at least a third product; and
   add the at least third product to the first product and the second product to generate the first digital sum.

4. The digital equalizer circuit of claim 1, wherein the DFE is further configured to identify the at least one predetermined sequence comprising the first digital sum based on the first level.

5. The digital equalizer circuit of claim 4, wherein the DFE is further configured to identify the at least one predetermined sequence in a look-up table based on the first level.

6. The digital equalizer circuit of claim 1, wherein the successive comparison circuit is configured to determine the first level corresponding to the first digital sum, is further configured to:
   compare the first digital sum to a first reference sum in a range of digital sums to determine a first portion comprising the first digital sum, the first portion comprising a subset of the range of digital sums;
   compare the first digital sum to a second reference sum in the first portion to determine a second portion comprising the first digital sum, the second portion comprising a subset of the first portion;
   compare the first digital sum to a third reference sum in the second portion to determine a third portion comprising the first digital sum, the third portion comprising a subset of the second portion;
   successively compare the first digital sum to reference sums in progressively smaller portions of the range of digital sums to determine a subset of the range of digital sums comprising the first digital sum until the subset comprises a single digital sum; and
   determine the first level corresponding to the first digital sum based on a level of the smaller portion comprising the single digital sum.

7. The digital equalizer circuit of claim 1, wherein the feed-forward selection circuit is configured to select the selected one of the at least one predetermined sequence based on a predetermined sequence selected for the second UI adjacent to the first UI.

8. The digital equalizer circuit of claim 1, wherein the feed-forward selection circuit is configured to select the selected one of the at least one predetermined sequence based on the at least one predetermined sequence comprising only one predetermined sequence.

9. The digital equalizer circuit of claim 1, wherein the level-to-sequence generation circuit is configured to identify the at least one predetermined sequence of levels of digital sums of consecutive UIs, is further configured to identify the at least one predetermined sequence of levels corresponding to digital sums of at least three consecutive UIs of the analog signal.

10. The digital equalizer circuit of claim 1, wherein the DFE is further configured to be programmed to decode the digital data comprising any of 2, 4, 6, and 8 possible values in the first UI.

11. A method of decoding digital data received in a digital equalizer circuit, the method comprising:
- determining digital voltages in respective unit intervals (UIs) of an analog signal;
- generating a first digital sum based on a digital voltage of the analog signal in a first UI and on a second digital voltage of the analog signal of a second UI adjacent to the first UI;
- determining a first level corresponding to the first digital sum;
- identifying at least one predetermined sequence of levels of digital sums of consecutive UIs, wherein each of the at least one predetermined sequence comprises the first level in the first UI;
- selecting one of the at least one predetermined sequence; and
- decoding digital data encoded in the analog signal in the first UI based on the selected predetermined sequence.

12. The method of claim 11, further comprising:
- receiving the digital voltage for the first UI;
- multiplying the digital voltage by a first coefficient to generate a first product;
- receiving the second digital voltage for the second UI;
- multiplying the second digital voltage by a second coefficient to generate a second product; and
- adding the first product and the second product to generate the first digital sum.

13. The method of claim 12, further comprising, in response to being programmed:
- receiving at least a third digital voltage for at least a third UI adjacent to one of the first UI and the second UI;
- multiplying each of the at least third digital voltage by a corresponding coefficient to generate at least a third product; and
- adding the at least third product to the first product and the second product to generate the first digital sum.

14. The method of claim 13, further comprising, in response to being programmed, decoding the digital data comprising any of 2, 4, 6, and 8 possible values in the first UI.

15. The method of claim 11, further comprising identifying the at least one predetermined sequence comprising the first digital sum based on the first level.

16. The method of claim 11, further comprising identifying the at least one predetermined sequence comprising the first digital sum in a look-up table based on the first level.

17. The method of claim 11, further comprising:
- comparing the first digital sum to a first reference sum in a range of reference sums to determine a half of the range of reference sums comprising the first digital sum;
- comparing the first digital sum to a second reference sum in the half of the range of reference sums to determine a quarter of the range of reference sums comprising the first digital sum;
- comparing the first digital sum to a third reference sum in the quarter of the range of reference sums to determine an eighth of the range of reference sums comprising the first digital sum; and
- determining the first level corresponding to the first digital sum based on levels corresponding to the first reference sum, the second reference sum, and the third reference sum.

18. The method of claim 11, further comprising selecting the selected one of the at least one predetermined sequence for the first UI based on a predetermined sequence selected for the second UI adjacent to the first UI.

19. The method of claim 11, further comprising selecting the selected one of the at least one predetermined sequence for the first UI based on the at least one predetermined sequence comprising only one predetermined sequence.

20. The method of claim 11, wherein identifying the at least one predetermined sequence of levels of digital sums of consecutive UIs, further comprises identifying the at least one predetermined sequence of levels corresponding to digital sums of at least three consecutive UIs of the analog signal.

* * * * *